(12) United States Patent
Kano

(10) Patent No.: US 7,822,854 B2
(45) Date of Patent: Oct. 26, 2010

(54) FOOTPRINT-PROVIDING DEVICE AND FOOTPRINT-PROVIDING SYSTEM

(75) Inventor: Nobuyuki Kano, Tokyo (JP)

(73) Assignee: Mediaindex Co., Ltd., Tokyo (JP)

( * ) Notice: Subject to any disclaimer, the term of this patent is extended or adjusted under 35 U.S.C. 154(b) by 4 days.

(21) Appl. No.: 12/492,776

(22) Filed: Jun. 26, 2009

(65) Prior Publication Data
US 2009/0265465 A1 Oct. 22, 2009

(30) Foreign Application Priority Data
Dec. 28, 2006 (JP) .............................. 2006-354913

(51) Int. Cl.
*G06F 15/173* (2006.01)
(52) U.S. Cl. .................. 709/224; 709/222; 709/223; 709/203; 715/507; 715/772; 345/738
(58) Field of Classification Search ................ 709/213, 709/224, 203, 223; 715/507, 772; 345/738
See application file for complete search history.

(56) References Cited

U.S. PATENT DOCUMENTS

| 5,263,032 | A  * | 11/1993 | Porter et al. ................. 714/764 |
| 5,796,952 | A    | 8/1998  | Davis et al. |
| 6,138,155 | A    | 10/2000 | Davis et al. |
| 6,934,740 | B1 * | 8/2005  | Lawande et al. ............. 709/213 |
| 6,938,079 | B1 * | 8/2005  | Anderson et al. ........... 709/222 |
| 6,941,285 | B2 * | 9/2005  | Sarcanin ....................... 705/67 |
| 7,237,002 | B1 * | 6/2007  | Estrada et al. ............... 709/203 |
| 7,363,308 | B2 * | 4/2008  | Dillon et al. ................. 707/706 |
| 7,627,658 | B2 * | 12/2009 | Levett et al. ................. 709/223 |
| 7,685,279 | B2 * | 3/2010  | Miltonberger et al. ...... 709/225 |
| 7,752,259 | B2 * | 7/2010  | Weiser et al. ................ 709/203 |
| 2003/0142126 | A1 * | 7/2003 | Estrada et al. ............... 345/738 |
| 2004/0034831 | A1 * | 2/2004 | Grober et al. ................ 715/507 |
| 2004/0194150 | A1 * | 9/2004 | Banker ......................... 725/135 |
| 2005/0044197 | A1 * | 2/2005 | Lai ............................... 709/223 |
| 2008/0270929 | A1 * | 10/2008 | Bohn et al. ................... 715/772 |
| 2008/0275886 | A1 * | 11/2008 | Caruso et al. ................. 707/10 |
| 2009/0210245 | A1 * | 8/2009  | Wold ............................. 705/1 |

FOREIGN PATENT DOCUMENTS

JP 2004-246488 9/2004
JP 2005208997 A * 8/2005

OTHER PUBLICATIONS

English Translation of 2004-246488.

* cited by examiner

*Primary Examiner*—Thu Ha T Nguyen
(74) *Attorney, Agent, or Firm*—Ladas & Parry LLP

(57) ABSTRACT

A footprint-providing device which can put footprints on Web pages provided by various Web servers. The footprint-providing device is connected via a network to a client terminal that views a Web page with a browser. The footprint-providing device sends footprint data, which can be written on one part of the Web page that has been received by the browser of client terminal, to the browser receiving the Web page from a Web server as a response to a request that is made asynchronously with a view-request for the Web page by the browser.

2 Claims, 15 Drawing Sheets

| id | visitor | owner | accessed_at |
|----|---------|-------|-------------|
| 1 | 60 | 7 | 2006-12-10 11:00:00 |
| 2 | 31 | 50 | 2006-12-10 16:30:00 |
| 3 | 48 | 7 | 2006-12-11 09:00:00 |
| 4 | 53 | 31 | 2006-12-13 08:00:00 |
| 5 | 78 | 38 | 2006-12-14 01:00:00 |
| ... | ... | ... | ... |

FIG. 7

| id | user_id | ashi_id | user name | title | sex | age | occupation | address | comment | url |
|---|---|---|---|---|---|---|---|---|---|---|
| 1 | 60 | ashiD1 | Taro | Mr. | Male | 23 | College student | Tokyo | Best regards! | http://blog.abcabc.com |
| 2 | 48 | ashiD2 | Hanahana | Mrs. | Female | Secret | Housewife | Osaka | I'm a freshman housewife. | http://blog.aaabbb.com |
| 3 | 32 | ashiD3 | Man Yamada | Mr. | Male | 34 | Office worker | Fukuoka | I'm working hard everyday! | http://blog.bbbccc.com |
| 4 | 17 | ashiD4 | picopico | Miss | Female | Secret | Office worker | Tokyo | Please check my blog too ♪ | http://blog.hogehoge.com |
| ... | ... | ... | ... | ... | ... | ... | ... | ... | ... | ... |

FOOTPRINT-PROVIDING DEVICE AND FOOTPRINT-PROVIDING SYSTEM

This is a continuation of copending International Application JP2007/001374 filed on Dec. 10, 2007, which designated the U.S., claims the benefit thereof and incorporates the same by reference.

BACKGROUND OF THE INVENTION

1. Field of the Invention

The present invention relates generally to the technology of putting footprints on Web pages.

2. Related Art

In the past, regarding views of homepages, a homepage viewing footprint system which leaves the viewer's footprint on the homepage has been proposed (see Patent Document 1 identified below). This homepage viewing footprint system works as follows. If a view-request for a homepage is performed from a user terminal to a homepage management server, a homepage a member is maintaining is provided from a homepage providing section of the homepage management server to the user terminal. Then, the user who performed the view-request is identified by a homepage viewing monitoring section of the homepage management server. If the user is identified as a member, footprint information of the member is additionally written on the homepage that the view-request was performed for by a footprint information additionally-writing section of the homepage management server.

[Patent Document 1] Unexamined Patent Application Publication No. 2005-208997.

SUMMARY OF THE INVENTION

However, the homepage viewing footprint system described above is a system in which footprint information is additionally written on the homepage that the view-request was performed for to the homepage management server. Consequently, the footprint information cannot be displayed on Web pages provided by Web servers other than the homepage management server because the view-requests for the Web pages are not performed to the homepage management server.

The present invention has a purpose of providing a footprint-providing device which can put footprints on Web pages provided by various Web servers.

According to the present invention, the above problem can be solved by the following.

In accordance with one aspect, the present invention is a footprint-providing device connected via a network to client terminals that view Web pages with a browser, comprising: sending footprint data, which can be written on one part of a Web page, to said browser receiving said Web page from a Web server as a response to a request that is made asynchronously with a view-request for the Web page by the browser.

The footprint-providing device of the present invention sends footprint data, which can be written on one part of a Web page, to a browser that received the Web page from a Web server. Therefore, if the footprint-providing device of the present invention is connected to a network, it enables to write footprint data by browsers on one part of Web pages received from Web servers, and browsers of client terminals can display footprints even on Web pages provided by Web servers that comprise no means of putting on footprints.

In accordance with another aspect of the present invention, there is provided a footprint-providing device connected via a network to client terminals that view Web pages with a browser, comprising: a footprint data storing means for storing footprint data of Web pages; a footprint client program send-request receiving means for receiving a footprint client program send-request from said browser; a footprint client program generating means for generating a footprint client program that runs on said browser, if said footprint client program send-request receiving means receives said footprint client program send-request; a footprint client program sending means for sending to said browser a footprint client program that is generated by said footprint client program generating means; a footprint data update-request receiving means for receiving a footprint data update-request, which specifies a Web page identifier that identifies a Web page being viewed by said browser and a footprint identifier that identifies a viewer, from said browser that said footprint client program runs on; a footprint data updating means for specifying said Web page identifier and said footprint identifier from said received footprint data update-request, and for updating footprint data stored in said footprint data storing means using said specified Web page identifier and said specified footprint identifier, if said footprint data update-request receiving means receives said footprint data update-request; a footprint data send-request receiving means for receiving a footprint send-request, which specifies a Web page identifier that identifies a Web page being viewed by said browser, from said browser that said footprint client program runs on; a footprint data sending means for specifying said Web page identifier from said received footprint data send-request, and for retrieving footprint data of a Web page being viewed by said browser that said footprint client program runs on out of footprint data stored in said footprint data storing means using said specified Web page identifier as a key, and for sending said retrieved footprint data to said browser that said footprint client program runs on, if said footprint data send-request receiving means receives said footprint data send-request; wherein said footprint client program generating means generates a footprint client program that is executable to perform a method comprising: a detecting step of making said browser detect said footprint identifier in data said browser holds; a footprint data update-request sending step of making said browser send said footprint data update-request to said footprint data update-request receiving means asynchronously with a view-request for a Web page if said footprint identifier is detected; a footprint send-request sending step of making said browser send said footprint data send-request to said footprint data send-request receiving means asynchronously with a view-request for a Web page if a footprint data send-request event occurs; a footprint data receiving step of making said browser receive said footprint data from said footprint data sending means asynchronously with a view-request for a Web page; and a writing step of making said browser write said received footprint data on one part of a Web page being viewed by said browser; wherein the footprint-providing device does not always send only footprint data, which indicates client terminals currently connected to a footprint-providing device.

In the above configuration, the footprint-providing device of the present invention is connected via a network to client terminals, and comprises: a footprint data storing means; a footprint client program send-request receiving means; a footprint client program generating means; a footprint client program sending means; a footprint data update-request receiving means; a footprint data updating means; a footprint data send-request receiving means; and a footprint data sending means.

(Footprint Data Storing Means)

A footprint data storing means stores footprint data of Web pages. Footprint data is data regarding views of Web pages and includes at least data specifying Web page viewers.

(Footprint Client Program Send-Request Receiving Means)

A footprint client program send-request receiving means receives from a browser a footprint client program send-request. A footprint client program send-request is a signal for requesting to send a footprint client program and is sent from, for example, a browser that has read a footprint client program send-request tag written on the Web page.

(Footprint Client Program Generating Means)

A footprint client program generating means generates a footprint client program that runs on the browser if a footprint client program send-request receiving means receives a footprint client program send-request. A footprint client program is a client-side program that runs on a browser of client terminals and is sent from a footprint-providing device of the present invention to a browser to be executed on the browser.

(Footprint Client Program Sending Means)

A footprint client program sending means sends to a browser a footprint client program that is generated by a footprint client program generating means.

(Footprint Data Update-Request Receiving Means)

A footprint data update-request receiving means receives a footprint data update-request, which can specify a Web page identifier that specifies a Web page being viewed by a browser and a footprint identifier that specifies a viewer, from a browser that a footprint client program is running on.

A footprint data update-request is a signal for requesting to update footprint data. With this signal, it enables to identify a Web page identifier and a footprint identifier (for example, one part of the bit string constituting the footprint data update-request, the bit string follows after that bit string, and so on can be used as the bit string indicating a Web page identifier or a footprint identifier).

A Web page identifier is the data written on a Web page for identifying a Web page. As a result, it enables to identify what Web page a browser is viewing. Moreover, a footprint identifier is data that identifies a browser viewing a Web page. As a result, it enables to identify a viewer of a Web page. A footprint identifier is sent from a footprint-providing device to a browser when, for example, a browser performs a user registration on the footprint-providing device, and is held by a browser.

(Footprint Data Updating Means)

A footprint data updating means specifies a Web page identifier and a footprint identifier from a footprint data update-request, and updates footprint data stored in a footprint data storing means using the specified Web page identifier and the specified footprint identifier, if a footprint update-request receiving means receives the footprint data update-request. From a Web page identifier and a footprint identifier, it is found who views which Web page. Footprint data is updated using these. Note that the footprint data updating means can also update footprint data using, for example, the date and time at which the footprint data update-request was received and so on, together with a Web page identifier and a footprint identifier.

(Footprint Data Send-Request Receiving Means)

A footprint data send-request receiving means receives a footprint data send-request, which specifies a Web page identifier that identifies a Web page being viewed by a browser, from the browser that a footprint client program is running on.

A footprint data send-request is data for requesting to send footprint data. With this signal, it enables to identify a Web page identifier (for example, one part of the bit string constituting the footprint data send-request, the bit string following that bit string, and so on, can be used as the bit string indicating a Web page identifier).

(Footprint Data Sending Means)

A footprint data sending means specifies a Web page identifier from a received footprint data send-request, and retrieves footprint data of a Web page being viewed by a browser that a footprint client program runs on out of footprint data stored in a footprint data storing means using the specified Web page identifier as a key, and sends the retrieved footprint data to the browser that the footprint client program runs on, if the footprint data send-request receiving means receives the footprint data send-request. This footprint data can be written on one part of the Web page. As a result, it enables to put footprint data on Web pages sent from Web servers that do not have a function to write footprint data on a Web page.

(Footprint Client Program)

As described above, a footprint client program generated by a footprint client program generating means is a client-side program running on a browser of a client terminal and is sent from a footprint-providing device of the present invention to a browser to be executed on the browser. This footprint client program may comprise the following steps.

<Detecting Step>

A detecting step is a step of making a browser detect a footprint identifier in data the browser holds.

<Footprint Data Update-Request Sending Step>

A footprint data update-request sending step is a step of making a browser send a footprint data update-request to a footprint data update-request receiving means asynchronously with a view-request for a Web page if footprint data is detected.

<Footprint Send-Request Sending Step>

A footprint send-request sending step is a step of making a browser send a footprint data send-request to a footprint data send-request receiving means asynchronously with a view-request for a Web page if a footprint data send-request event occurs. A footprint data send-request event is an event such as "a given area on a Web page was clicked" or "a given time has elapsed since a Web page was downloaded from a Web server", for example.

<Footprint Data Receiving Step>

A footprint data receiving step is a step of making a browser receive footprint data from a footprint data sending means asynchronously with a view-request for a Web page.

<Writing Step>

A writing step is a step of making a browser write footprint data on one part of a Web page viewing the browser. As a result, a Web page footprint data written on one part thereof is displayed on a client terminal monitor by a browser. Therefore, it enables to display footprint data on Web pages sent from Web servers that do not have a function to write footprint data on Web pages.

As described above, the footprint client program does, for example, make a browser send and receive data between the browser and a footprint-providing device. However, this sending and receiving are performed "asynchronously with a view-request for a Web page". In this way, a footprint client program enables to display footprints on Web pages without making a browser cause screen transitions and wait for responses of view-requests for a Web page (enabling a browser performs other processes during the moment from a view-request to a response). Note that in this specification, a view-request for a Web page means a view-request for a Web page to a footprint-providing device.

EFFECTS OF THE INVENTION

As described above, according to the footprint-providing device of the present invention, it is possible to put footprints on Web pages provided by various Web servers.

BRIEF DESCRIPTION OF THE DRAWINGS

FIG. 7 is a diagram showing a storing example of footprint data in a footprint data storing means of a footprint data section;
FIG. 9 is a diagram showing a storing example of user data in a user data storing means that a user data section comprises.

DESCRIPTION OF REFERENCE SYMBOLS

Figure 1:
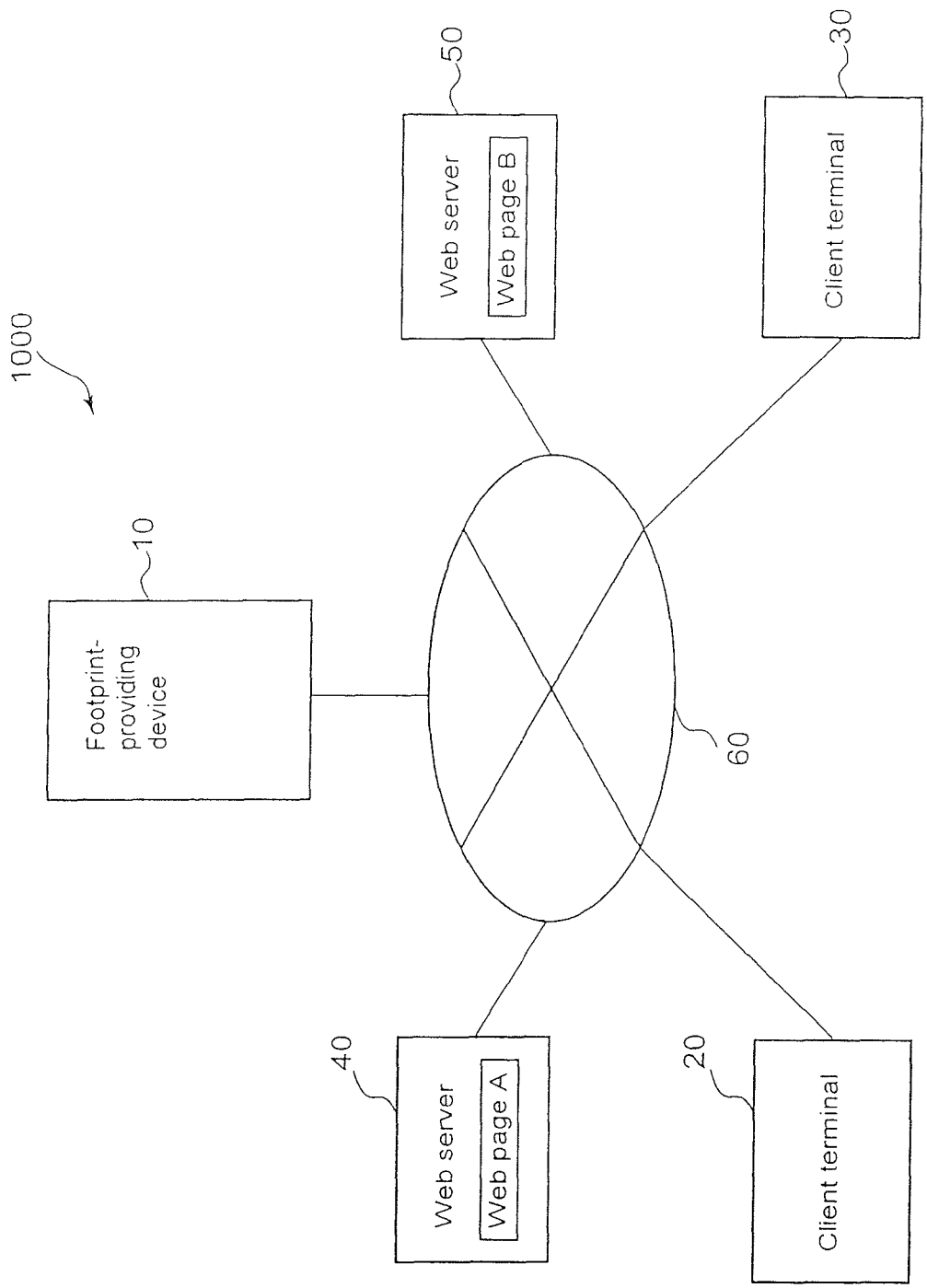
FIG. 1 is a diagram showing a footprint-providing system of an embodiment of the present invention.

10 Footprint-providing device
11 Footprint management section
12 Footprint client program section
12a Footprint client program generating means
12b Footprint client program data storing means
13 Footprint data section
13a Footprint data processing means
13b Footprint data storing means
14 User data section
14a User data processing means
14b User data storing means
15 Send/receive section
20 Client terminal
30 Client terminal
40 Web server
50 Web server
100 Link image
200 Footprint data
300 User data
1000 Footprint providing system

DETAILED DESCRIPTION OF THE INVENTION

Figure 2:
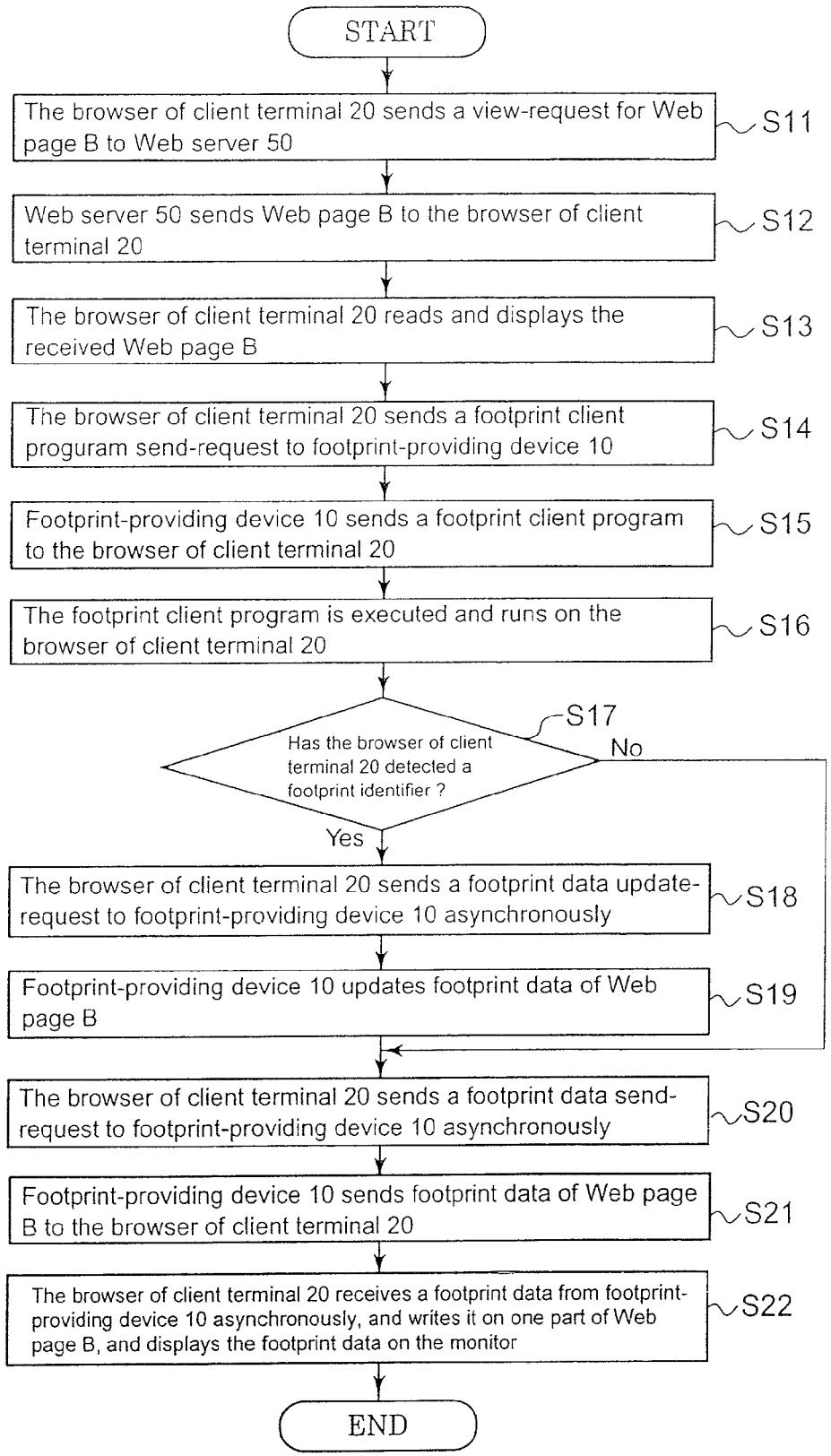
FIG. 2 is a diagram showing an operation example of a footprint-providing system of an embodiment of the present invention.

The present invention is described below with reference to the attached drawings.
FIG. 1 is a diagram showing a footprint-providing system of an embodiment of the present invention.
As shown in FIG. 1, in a footprint-providing system 1000 of an embodiment of the present invention, footprint-providing device 10 of an embodiment of the present invention is connected to client terminal 20 and client terminal 30 via network 60, wherein client terminals 20 and 30 are connected to Web server 40 and Web server 50 via network 60.
Web page A is stored in Web server 40. Web page A is maintained (created, updated, deleted, and so on) by the user of client terminal 20, who uploads it from client terminal 20, and can be viewed by downloading it to the browser of client terminal 30 (it can also be viewed downloading it to the browser of client terminal 20.)
In addition, Web page B is stored in Web server 50. Web page B is maintained (created, updated, deleted, and so on) by the user of client terminal 30, who uploads it from client terminal 30, and can be viewed by downloading it to the browser of client terminal 20 (it can also be viewed by downloading it to the browser of client terminal 30.)
Note that network 60 may be constructed with optical fiber networks, telephone line networks and so on. Moreover, Web server 40, 50 and client terminals 20, 30 may communicate with each other, for example, in accordance with the Hypertext Transfer Protocol (HTTP). Web pages A and B may be electronic files written in, for example, the Hypertext Markup Language (HTML).
FIG. 2 is a diagram showing an operation example of a footprint-providing system of an embodiment of the present invention.
As shown in FIG. 2, in a footprint-providing system of an embodiment of the present invention, first, the browser of client terminal 20 sends a view-request for Web page B to Web Server 50 (Step S11).
Next, Web server 50 that received the view-request sends Web page B to the browser of client terminal 20 (Step S12).
Next, the browser of client terminal 20 that received Web page B reads Web page B and displays Web page B on the monitor of client terminal 20 (Step S13).
Next, the browser of client terminal 20 that reads the Web page B sends a footprint client program send-request to footprint-providing device 10 (Step S14). The footprint client program send-request is a signal for requesting to send a footprint client program and is sent to footprint-providing device 10 when the browser of client terminal 20 reads a footprint client program send-request tag written on Web page B. The footprint client program send-request tag can be constructed as, for example, a code written in scripting language and so on to make the browser of client terminal 20 send the footprint client program send-request to footprint-providing device 10. Note that, in this embodiment of the present invention, an owner value of Web page B is written in this footprint client program send-request tag.

Next, footprint-providing device 10 that received the footprint client program send-request sends a footprint client program to the browser of client terminal 20 (Step S15). The footprint client program is a client-side program that runs on the browser of the client terminals and can be constructed as, for example, a code written in scripting language and so on.

Next, the browser of client terminal 20 that received the footprint client program reads the received footprint client program. As a result, the footprint client program is executed and runs on the browser of terminal 20 (Step S16).

Next, the footprint client program that is running on the browser of client terminal 20 makes the browser detect a footprint identifier in a cookie the browser holds (Step S17). The footprint identifier is data for identifying the browser viewing Web page B (the browser of client terminal 20). As a result, it enables to identify that the viewer of Web page B is the user of client terminal 20. This footprint identifier is sent from footprint-providing device 10 to the browser of client terminal 20 when, for example, performing the user registration from the browser of client terminal 20 to footprint-providing device 10. The footprint identifier is held in the browser of client terminal 20. It is noted that a cookie is an example of data the browser holds.

Now, if the browser detected the footprint identifier, the footprint client program that is running on the browser of client terminal 20 makes the browser send a footprint data update-request, which specifies the detected footprint identifier and an owner value of Web page B (which is a value for identifying the user of client terminal 30), to footprint-providing device 10 (Step S18). The footprint data update-request is a signal for requesting to update footprint data. With this signal, it enables to identify a Web page identifier and a footprint identifier (for example, one part of the bit string constituting the footprint data update-request, the bit string following that bit string, and so on can be used as the bit string indicating a Web page identifier or a footprint identifier). The owner value of Web page B (value identifying the user of client terminal 30) is an example of the "Web page identifier". As a result, it enables to identify that the Web page viewing on the browser of client terminal 20 is the Web page that is maintained by the user of client terminal 30. This sending is done without making the browser perform a view-request for a Web page to footprint-providing device 10, that is, asynchronously with a view-request for a Web page. Note that if the browser does not detect a footprint identifier, the process goes to the next step S20 while skipping steps S18 and S19.

Next, footprint-providing device 10 that received the footprint data update-request specifies the owner value and the footprint identifier from the footprint data update-request and updates footprint data stored in footprint data storing means using the specified owner value and the specified footprint identifier (Step S19).

Now, assume that a given area on Web page B is clicked. In this case, the footprint client program that is running on the browser of client terminal 20 makes the browser send a footprint data send-request, which specifies the owner value of Web page B, to footprint-providing device 10 (Step S20). This sending is also done without making the browser perform a view-request for a Web page to footprint-providing device 10, that is, asynchronously with a view-request for a Web page. Note that the above-mentioned clicking is an example of a "footprint data send-request event".

Next, footprint-providing device 10 that received the footprint data send-request specifies the owner value from the footprint data send-request, and retrieves the footprint data of Web page B out of footprint data stored in footprint data storing means using the specified owner value as a key, and sends the retrieved footprint data to the browser of client terminal 20 (Step S21).

Next, the footprint client program that is running on the browser of the client terminal 20 makes the browser receive the footprint data from footprint-providing device 10 and write the received footprint data on one part of Web page B (Step S22). As a result, the Web page, which the footprint data is written on one part of, is displayed by the browser on the monitor of client terminal 20. Therefore, in the browser of client terminal 20, the footprint is displayed on Web page B even if Web server 50 does not have the function to write footprint data on Web page B. The receiving of footprint data from footprint-providing device 10 is done without making the browser perform a view-request for a Web page to footprint-providing device 10, that is, asynchronously with a view-request for a Web page.

Figure 3:
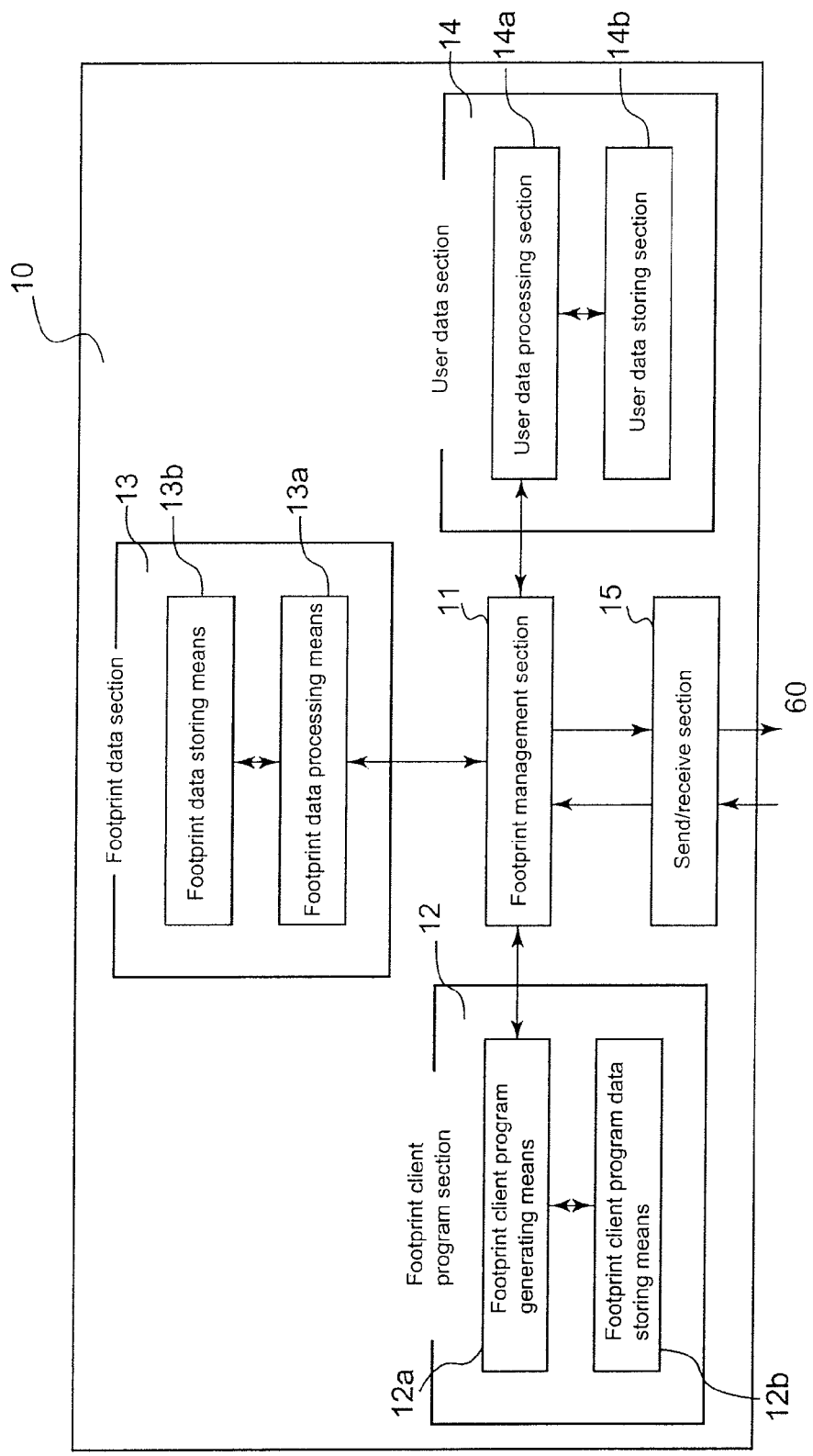
FIG. 3 is a schematic block diagram showing a footprint-providing device of an embodiment of the present invention.

FIG. 3 is a schematic block diagram showing a footprint-providing device of an embodiment of the present invention.

As shown in FIG. 3, footprint-providing device 10 of an embodiment of the present invention comprises footprint management section 11; footprint client program section 12 comprising footprint client program generating means 12a and footprint client program data storing means 12b; footprint data section 13 comprising footprint data processing means 13a and footprint data storing means 13b; user data section 14 comprising user data processing means 14a and user data storing means 14b; and send/receive section 15.

Footprint management section 11, footprint client program generating means 12a of footprint client program section 12, footprint data processing means 13a of footprint data section 13, and user data processing means 14a are constructed with a CPU, a main memory, and so on. And footprint client program data storing means 12b of footprint client program section 12, footprint data storing means 13b of footprint data section 13, and user data storing means 14b of user data section 14 are constructed with storage devices such as hard disks and so on. Moreover, send/receive section 15 is constructed with a network interface device such as network interface cards (NIC), modems, and so on.

Operation examples of each sections and means above-mentioned are described below with reference to FIG. 4.

Figure 4:
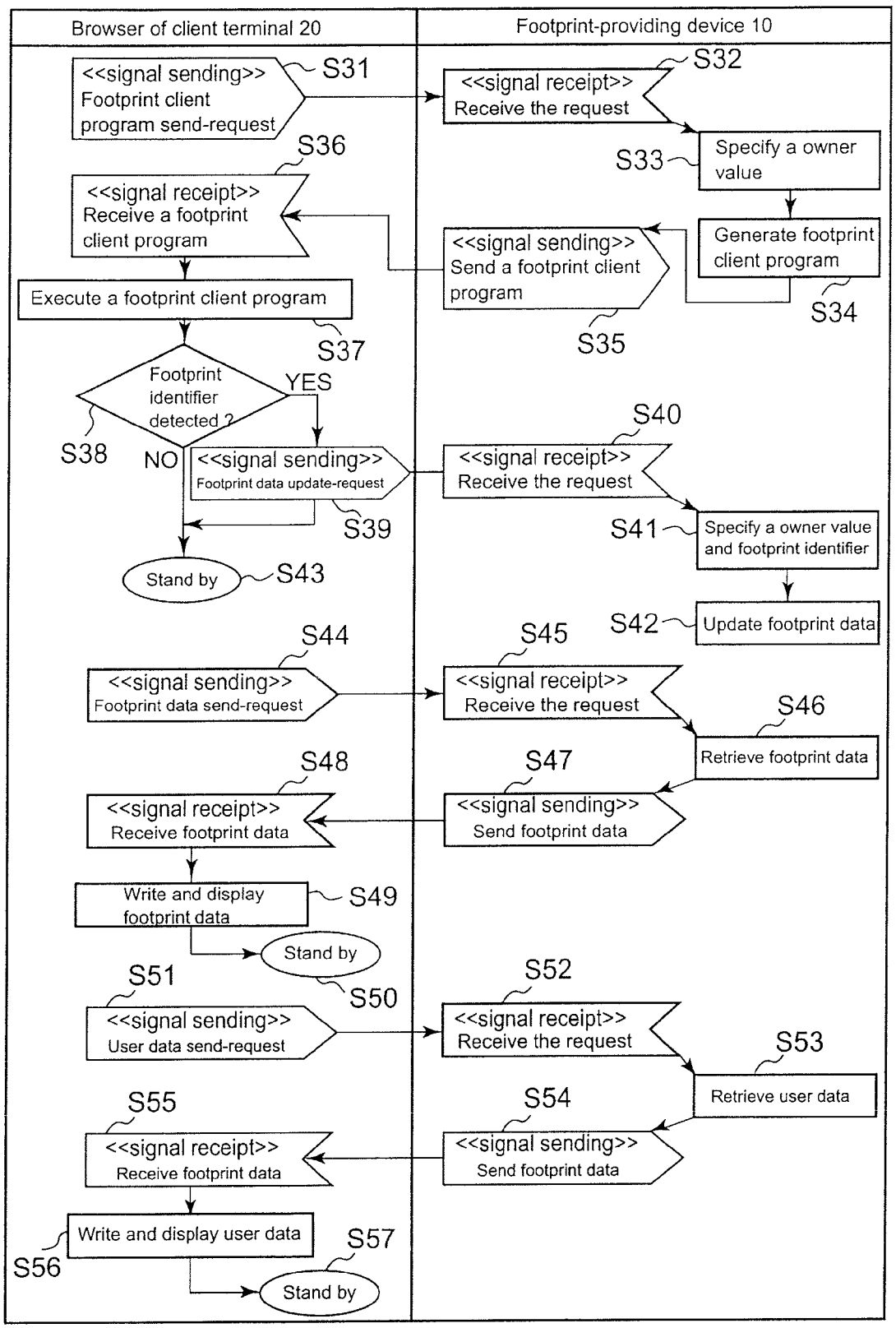
FIG. 4 is a descriptive diagram showing an operation example of a footprint-providing device of an embodiment of the present invention.

FIG. 4 is a descriptive diagram showing an operation example of a footprint-providing device of an embodiment of the present invention.

As shown in FIG. 4, if the footprint client program send-request is sent from the browser of client terminal 20 (Step S31), this footprint client program send-request is received by send/receive section 15 of footprint-providing device 10 (Step S32).

The footprint client program send-request that is received by send/receive section 15 is sent to footprint management section 11 and footprint management section 11 sends the received footprint client program send-request to footprint client program generating means 12a of footprint client program section 12.

Footprint client program generating means 12a specifies the owner value of Web page B from the received footprint client program send-request (Step S33), and generates a footprint client program using the specified owner value and the data retrieved from footprint client program data storing means 12b (Step S34). Now, the footprint client program data that is stored in footprint client program data storing means 12b is data for generating a footprint client program. Note that, in the present embodiment, the footprint client program is generated as the program including the owner value of Web page B to be the unique program to Web page B.

Footprint client program generating means 12a that generated the footprint client program sends the generated footprint client program to footprint management section 11, and footprint management section 11 sends the footprint client program that was sent from to the browser of client terminal 20 via send/receive section 15 (Step S35).

The browser of client terminal 20 receives the footprint client program (Step S36), and reads the received footprint client program and makes it run (Step S37).

The footprint client program that is running on the browser of client terminal 20 makes the browser of client terminal 20 detect the footprint identifier in a cookie the browser holds (Step S38).

If the footprint identifier is detected by the browser, the footprint client program that is running on the browser of client terminal 20 makes the browser send a footprint data update-request, which specifies the detected footprint identifier and the owner value of the Web page (a value identifying the user of client terminal 30), to footprint-providing device 10 (Step S39). This sending is done without making the browser perform a view-request for a Web page to footprint-providing device 10, that is, asynchronously with a view-request for a Web page. Note that, in the present embodiment, since the footprint client program is generated as the program including the owner value of Web page B to be the unique program to Web page B, there is no need to make the browser detect the owner value of Web page B with the footprint client program. When the sending of the footprint data update-request is completed, or if the browser has not detected a footprint identifier, the footprint client program stands by (Step S43).

Next, send/receive section 15 of footprint-providing device 10 receives the footprint data update-request (Step S40) and sends this received footprint data update-request to footprint management section 11. Footprint management section 11 sends the footprint data update-request to footprint data processing means 13a of footprint data section 13. Footprint data processing means 13a specifies the owner value and footprint identifier from the footprint data update-request sent from (step S41) and updates footprint data stored in footprint data storing means 13b using the specified owner value and the specified footprint identifier (Step S42).

Now, assume that a given area on Web page B is clicked. In this case, the footprint client program that is running on the browser of client terminal 20 makes the browser send the footprint data send-request, which specifies the owner value of Web page B, to footprint-providing device 10 (Step S44). This sending is done without making the browser perform a view-request for a Web page to footprint-providing device 10, that is, asynchronously with a view-request for a Web page. Note that, in the present embodiment, since the footprint client program is generated as the program including the owner value of Web page B to be the unique program to Web page B, there is no need to make the browser detect the owner value of Web page B with the footprint client program.

Next, send/receive section 15 of footprint-providing device 10 receives the footprint data send-request (Step S45) and sends this received footprint data send-request to footprint management section 11. Footprint management section 11 sends the footprint data send-request to footprint data processing means 13a of footprint data section 13. Footprint data processing means 13a specifies the owner value from the footprint data send-request and retrieves footprint data of Web page B out of footprint data stored in footprint data storing means 13b using the specified owner value as a key (Step S46).

Footprint data processing means 13a sends the retrieved footprint data to footprint management section 11 and footprint management section 11 sends the footprint data to the browser of client terminal 20 via send/receive section 15 (Step S47).

Then, the footprint client program that is running on the browser of client terminal 20 makes the browser receive the footprint data without making the browser perform a view-request for a Web page to footprint-providing device 10, that is, asynchronously with a view-request for a Web page (Step S48), and makes the browser write the received footprint data on one part of Web page B (Step S49), and stands by (Step S50).

Now, assume that a viewer name in the footprint data of Web page B is clicked. In this case, the footprint client program that is running on the browser of client terminal 20 makes the browser send a user data send-request, which specifies a user identifier, to footprint-providing device 10 (Step S51). This sending is done without making the browser perform a view-request for a Web page to footprint-providing device 10, that is, asynchronously with a view-request for Web page. Note that a user identifier is the data which identifies the viewer included in the footprint data.

Next, send/receive section 15 of footprint-providing device 10 receives the user data send-request (Step S52) and sends the received user data send-request to footprint management section 11. Footprint management section 11 sends the user data send-request to user data processing means 14a of user data section 14. User data processing means 14a specifies the user identifier from the user data send-request, and retrieves user data out of user data stored in user data storing means 14b using the specified user identifier as a key (Step S53).

User data processing means 14a sends the retrieved user data to footprint management section 11 and footprint management section 11 sends the user data sent from to the browser of client terminal 20 via send/receive section 15 (Step S54).

Then, the footprint client program that is running on the browser of client terminal 20 makes the browser receive the user data without making the browser perform a view-request for a Web page to footprint-providing device 10, that is, asynchronously with a view-request for a Web page (Step S55), and makes the browser write and displays the received user data on one part of Web page B (Step S56), and stands by (Step S57).

Figure 5:
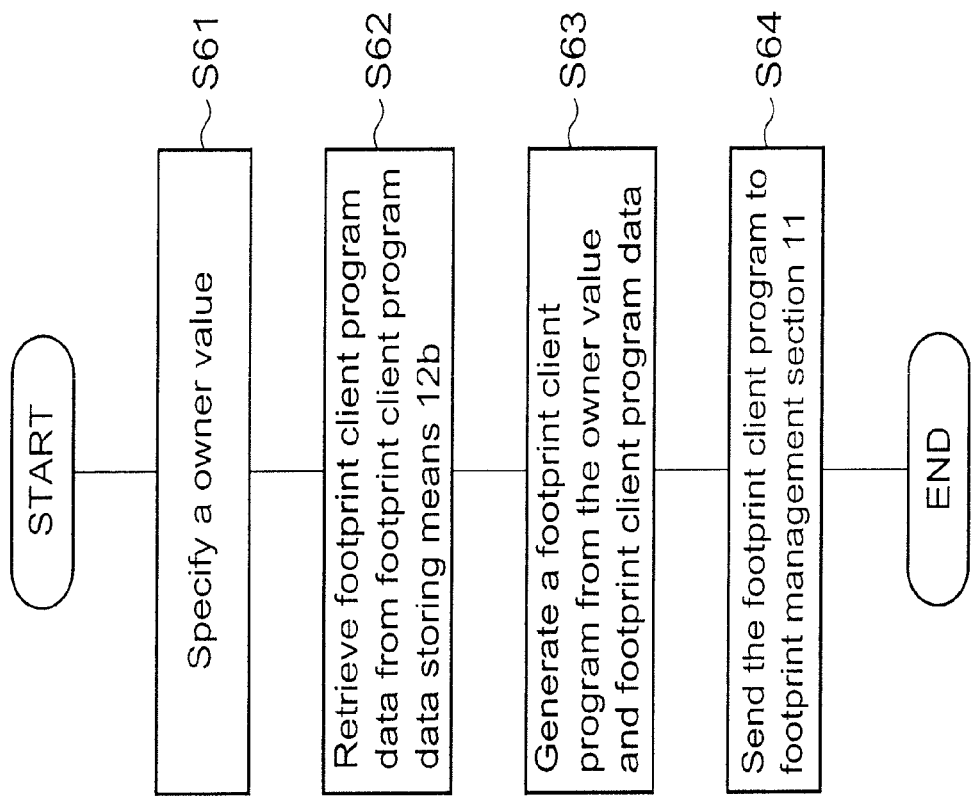
FIG. 5 is a flowchart showing an operation example of a footprint client program generating means that a footprint client program section comprises.

FIG. 5 is a flowchart showing an operation example of a footprint client program generating means that a footprint client program section comprises.

As shown in FIG. 5, footprint client program generating means 12a specifies the owner value of Web page B from the footprint client program send-request (Step S61).

Next, footprint client program generating means 12a retrieves footprint client program data from footprint client program data storing means 12b (Step S62).

Next, footprint client program generating means 12a generates the footprint client program from the owner value of Web page B and footprint client program data (Step S63).

Next, footprint client program generating means 12a sends the generated footprint client program to footprint management section 11 (Step S64)

Figure 6:
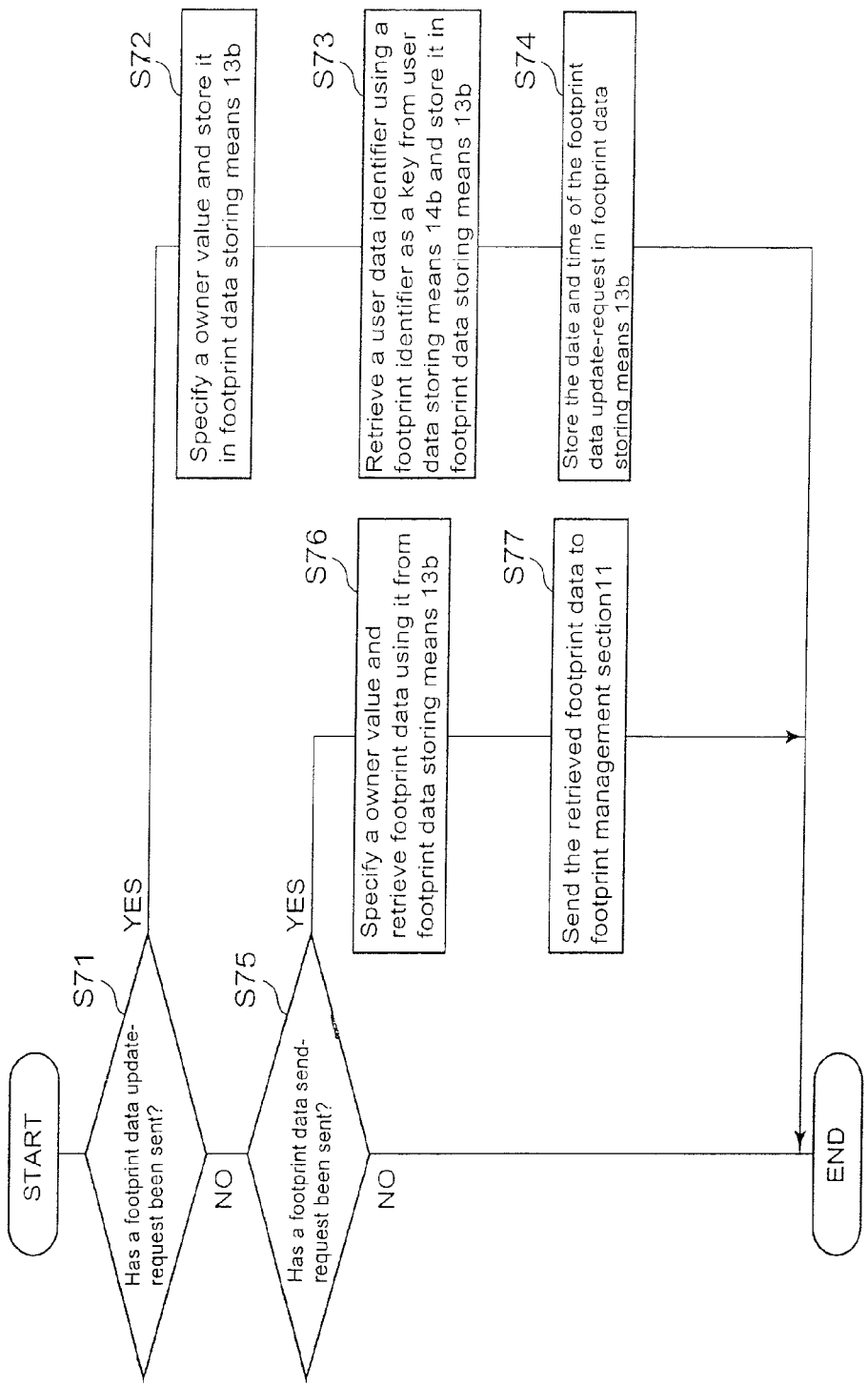
FIG. 6 is a flowchart showing an operation example of a footprint data processing means that a footprint client program section comprises.

FIG. 6 is a flowchart showing an operation example of a footprint data processing means that a footprint client program section comprises.

As shown in FIG. 6, footprint data processing means 13a determines whether the footprint data update-request has been sent from footprint management section 11 (Step S71), and if it has been sent, specifies the owner value of Web page B specified by the footprint data update-request, and stores the specifies owner value in footprint data storing means 13b as footprint data (Step S72). As described later, footprint data storing means 13b stores footprint data in table format, and footprint data processing means 13a stores the specified owner values in the "owner" field of the end of the records of the table.

Next, footprint data processing means 13a retrieves the user identifier stored in the "user_id" field from user data storing means 14b of user data section using the footprint identifier specified by the footprint data update-request sent from as a key, and stores the retrieved user identifier in the "visitor" field of the end of records of the table stored in footprint data storing means 13b (Step S73).

Next, footprint data processing means 13a stores the date and time when the footprint data update-request was received by send/receive section 15 in the "accessed_at" field of the end of the record (Step S74).

In Step S71, if it is determined that the footprint data update-request has not been sent, footprint data processing means 13a determines whether the footprint data send-request has been sent from footprint management section 11 (Step S75), and if it has been sent, retrieves data stored in each field of the record, in which the owner value is stored, out of footprint data stored in footprint data storing means 13b in table format using the owner value of Web page B specified by the footprint data send-request as a key (Step S76).

Next, footprint data processing means 13a generates the Extensible Markup Language (XML) data for displaying each retrieved data and sends it to footprint management section 11 as footprint data (Step S77). Note that the XML is an example of data formats for displaying footprint data.

FIG. 7 is a diagram showing an example of storing footprint data in a footprint data storing means of the footprint data section.

As shown in FIG. 7, footprint data is stored in table format. In the "id" field (the first column), serial numbers are stored. In the "visitor" field (the second field), values that identify the viewers of Web page B are stored. The values stored in this "visitor" field are in one-to-one correspondence with footprint identifiers and user identifiers. In the "owner" field (the third field), administrators of Web pages (in the present embodiment, the value which identifies the user of client terminal 30 who maintains Web page B) are stored. In the "accessed_at" field (the fourth field), the date and time at which send/received section 15 receives a footprint data update-request are stored.

Figure 8:
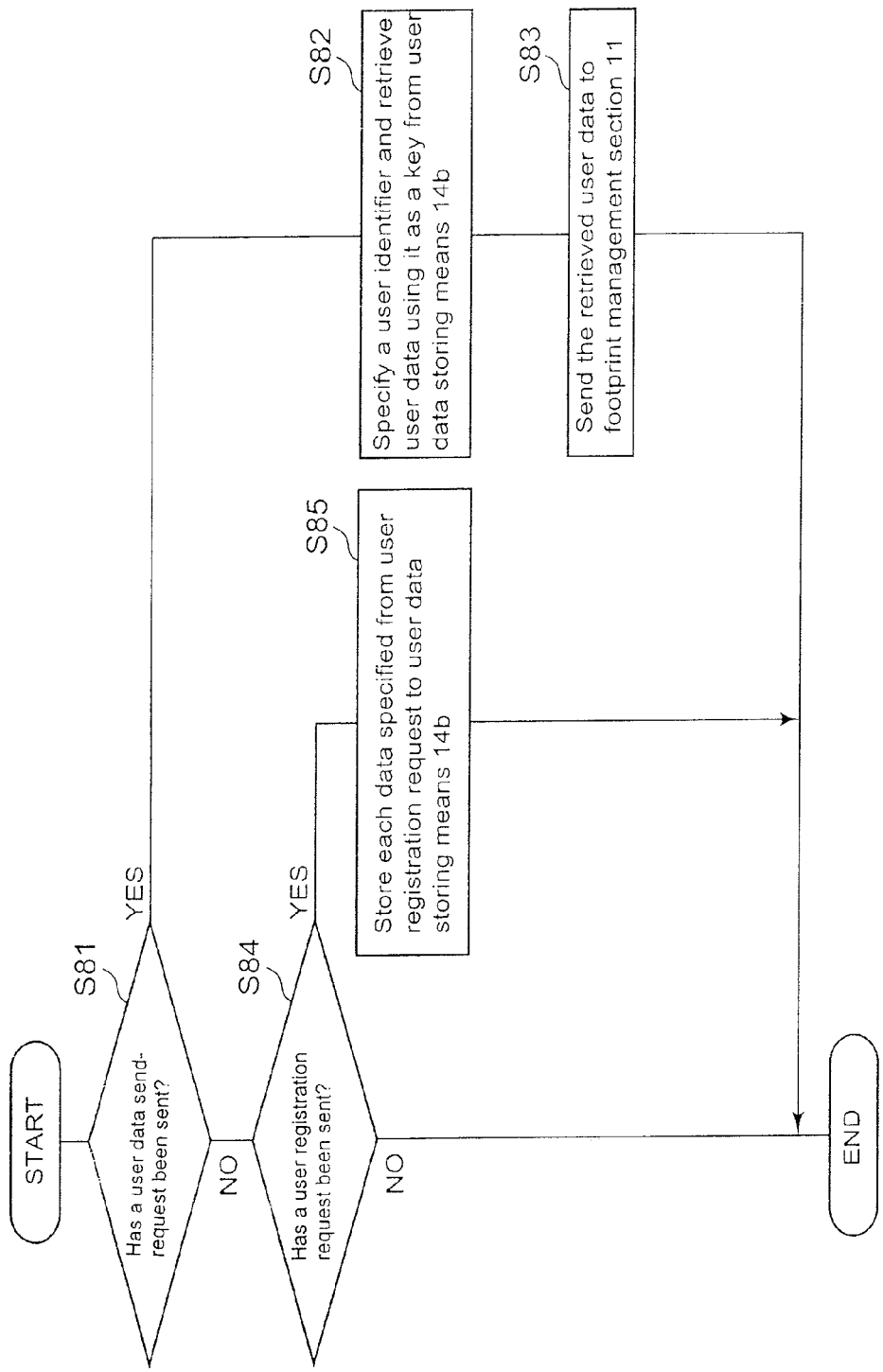
FIG. 8 is a flowchart showing an operation example of a user data processing means that a user data section comprises.

FIG. 8 is a flowchart showing an operation example of a user data processing means that a user data section comprises.

As shown in FIG. 8, user data processing means 14a determines whether the user data send-request has been sent from footprint management section 11 (Step S81), and if it has been sent, specifies the user identifier from the footprint data send-request, and retrieves user data stored in user data storing means 14b using the specified user identifier as a key (Step S82). As described later, user data storing means 14b stores user data in table format and user data processing means 13a retrieves data stored in each field of the record that the user identifier is stored in. Note that footprint data includes the values stored in the above-mentioned "visitor" field and these values are in one-to-one correspondence with user identifiers. Therefore, with constructing the user data send-request as the value which specifies the value stored in "visitor" field, it enables to specify the user identifier from the user data send-request via the value stored in "visitor" field.

Next, user data processing means 14a generates XML data for displaying each retrieved data and sends it to footprint management section 11 as user data (Step S83). Note that the XML is an example of a data format for displaying user data.

In Step S81, if it is determined that the user data send-request has not been sent, user data processing means 14a determines whether the user registration request has been sent from footprint management section 11 (Step S84), and if it has been sent, adds each data specified from the user registration request to user data stored in user data storing means 14b (Step S85). Concretely, it is to add a new record to user data in table format, and to store data in the added record. Note that the user registration request is done before, for example, the receiving of Web page B of Web server 50. And the user registration request is a request which is performed with sending a signal, which contains various types of data, from the browser of client terminal 20 that received a user registration form of footprint-providing device 10, and so on to footprint-providing device 10 via the user registration form. In the present embodiment, when this user registration request is performed and the above-mentioned various types of data are stored in the user data storing means as user data, a footprint identifier is sent from footprint-providing device 10 to the browser.

FIG. 9 is a diagram showing an example of storing user data in a user data storing means that a user data section comprises.

As shown in FIG. 9, user data are stored in table format. In the "id" field (the first column), serial numbers are stored. In the "user_id" field (the second column), values that identify the viewers of Web page B (in the present embodiment, the value which identifies the user of client terminal 20) are stored. The values stored in this "user_id" field are in one-to-one correspondence with the values of the "visitor" field stored in footprint storing means 13b and footprint identifiers. In the "ashi_id" field (the third column), footprint identifiers are stored. In the "user name" field (the fourth column), viewer names are stored. In the "title" field (the fifth column), titles are stored. In the "sex" field (the sixth column), genders are stored. In the "age" field (the seventh column), ages are stored. In the "occupation" field (the eighth column), occupations are stored. In the "address" field (the ninth column), addresses are stored. In the "comment" field (the tenth column), comments are stored. And in the "url" field (the eleventh column), URLs maintained by Web page viewers are stored.

Figure 10:
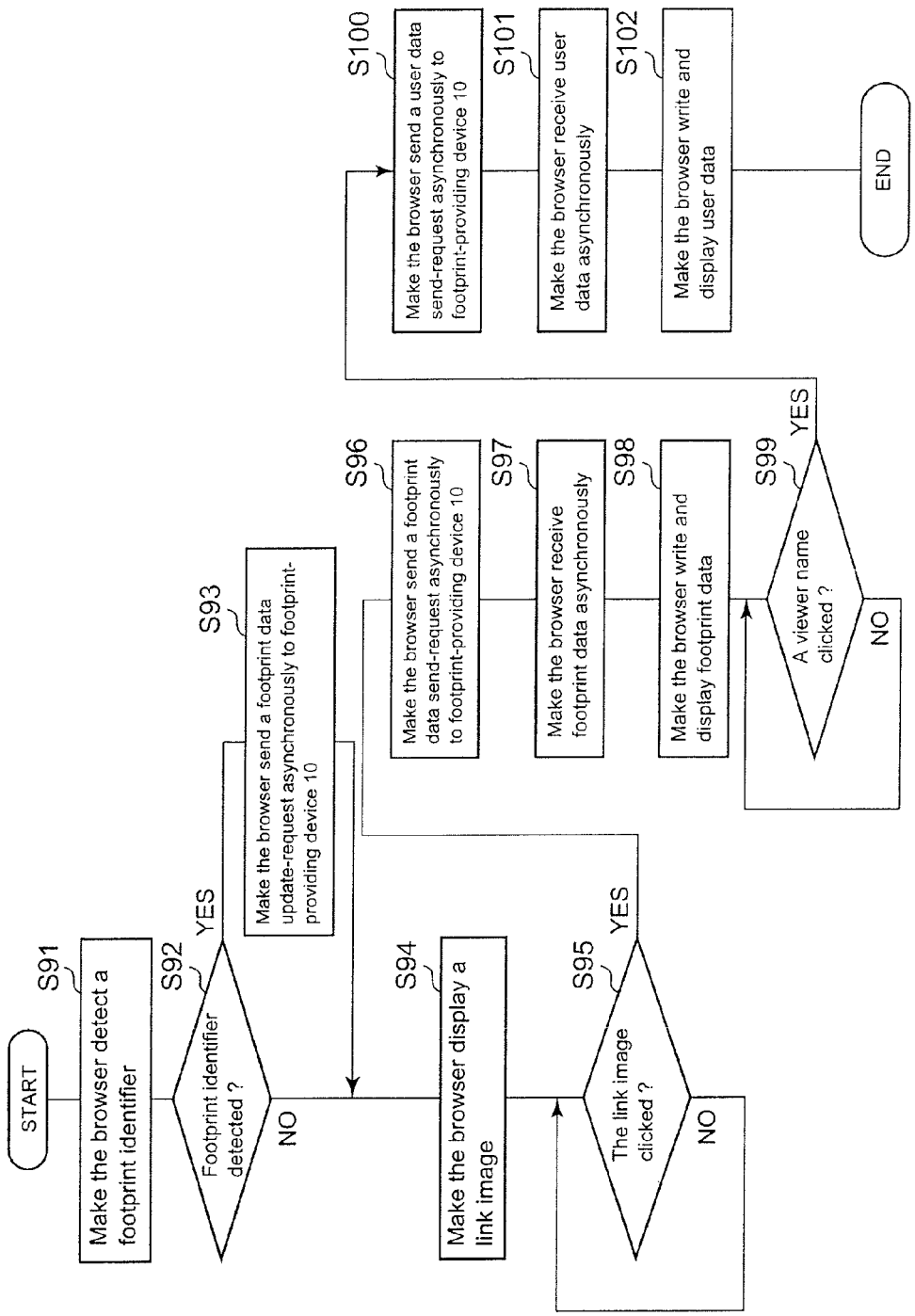
FIG. 10 is a flowchart showing an operation example of a footprint client program that is generated by footprint client program generating means 12a that footprint client program section 12 comprises.

FIG. 10 is a flowchart showing an operation example of a footprint client program that is generated by footprint client program generating means 12a that footprint client program section 12 comprises.

The footprint client program that is generated by footprint client program generating means 12a runs on the browser of client terminal 20 in the following manner.

First, the footprint client program makes the browser detect a footprint identifier in a cookie the browser held (Step S91).

Next, the footprint client program determines whether a footprint identifier was detected by the browser (Step S92), and if it was detected, makes the browser send a footprint data update-request, which specifies the owner value of Web page B and the footprint identifier, to footprint-providing device 10 (Step S93). The sending is done without making the browser perform a view-request for a Web page, that is, asynchronously with a view-request for Web page. If a footprint identifier was not detected, the footprint client program goes to the next step S94 while skipping step S93.

Next, the footprint client program makes the browser display a link image (Step S94).

Next, the footprint client program makes the browser determine whether the link image is clicked (Step S95), and if the image is clicked, makes the browser send a footprint data send-request, which identifies the owner value of Web page B, to footprint-providing device 10 (Step S96). This sending is done without making the browser perform a view-request for a Web page, that is, asynchronously with a view-request for a Web page.

Next, the footprint client program makes the browser receive the footprint data, from footprint-providing device 10 (Step S97) without making the browser perform a view-request for a Web page, that is, asynchronously with a view-request for a Web page, and makes the browser write the received footprint data on one part of Web page B the browser holds and displays it on Web page B (Step S98).

Next, the footprint client program makes the browser determine whether the viewer name on the footprint data is clicked (Step S99), and if the name is clicked, makes the browser send the user data send-request, which specifies the user identifier, to footprint-providing device 10 (Step S100). This sending is done without making the browser perform a view-request for a Web page, that is, asynchronously with a view-request for a Web page. Note that since the footprint data includes the values stored in the above-mentioned "visitor" field, the user data send-request is constructed as a signal that specifies the values stored in this "visitor" field. Hence, footprint-providing device 10 specifies the user identifier via the values stored in the "visitor" field.

Next, the footprint client program makes the browser receive the user data from footprint-providing device 10 (Step S101) without making the browser perform a view-request for Web page, that is, asynchronously with a view-request for Web page, and makes the browser write the received user data on one part of Web page B the browser holds, and displays it on Web page B (Step S102).

Embodiment 1

Next, how footprint data is displayed on Web page B on the monitor of client terminal 20 is described with reference to FIGS. 11-15. FIGS. 11-15 are diagrams showing examples of images appearing on the screen of a client terminal.

Figure 11:
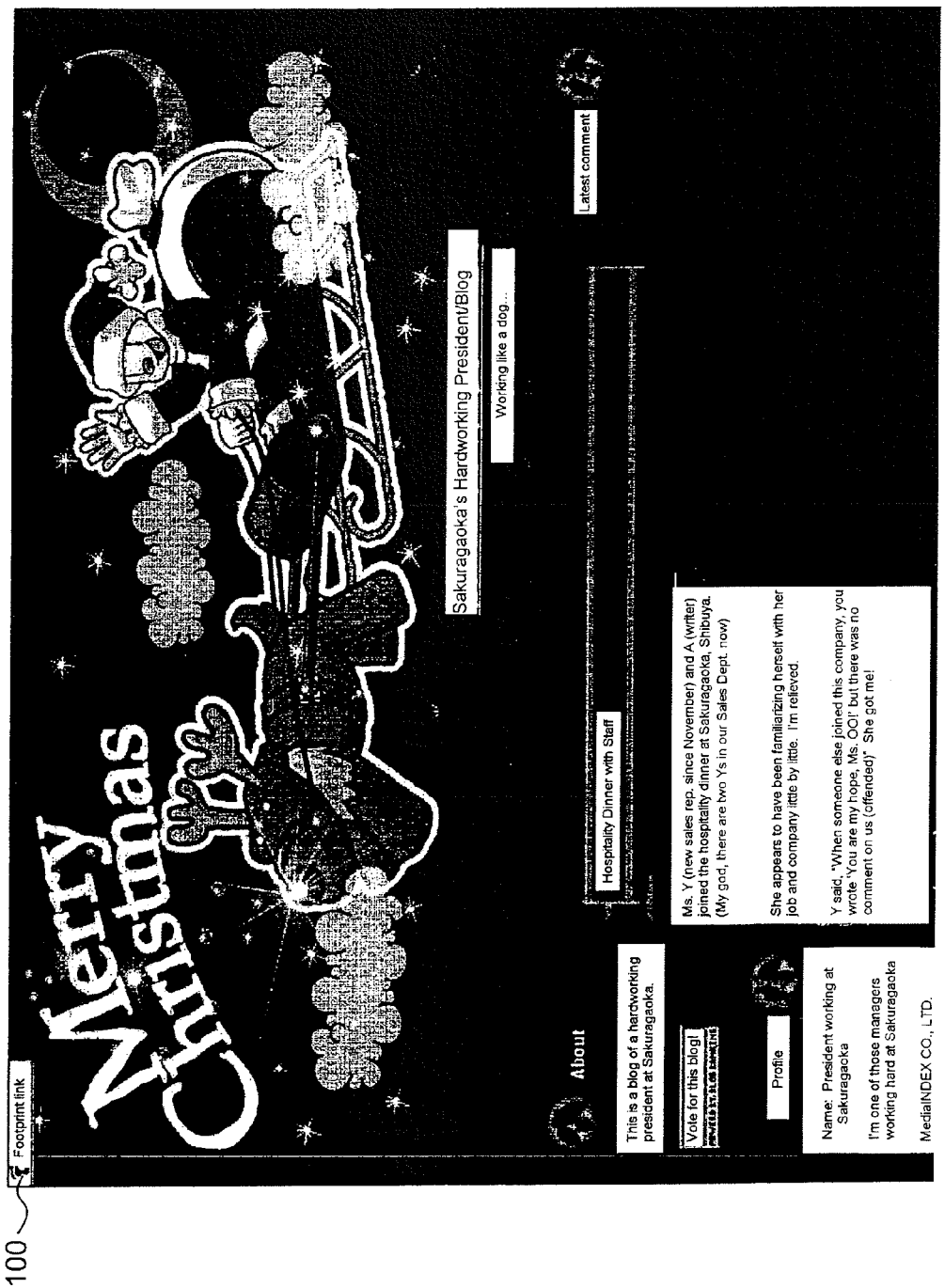
FIG. 11 is a diagram showing an example of images appearing on the screen of a client terminal.

First, if the footprint client program runs on the browser of client terminal 20, one part of Web page B is dynamically edited to display link image 100 called "footprint link" on the upper left of Web page B, as shown in FIG. 11.

Figure 12:
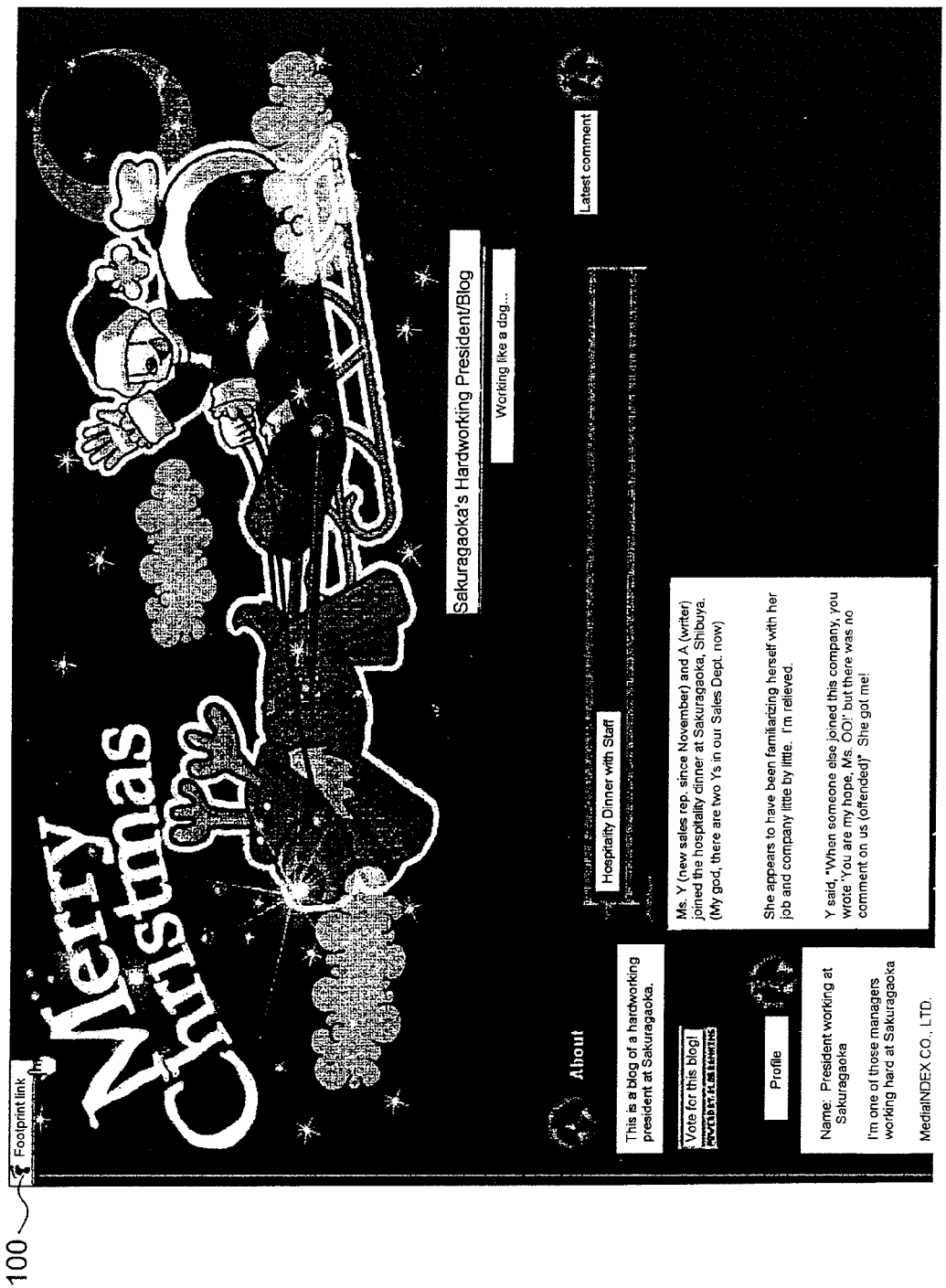
FIG. 12 is a diagram showing an example of images appearing on the screen of a client terminal.

If this link image 100 is pointed with a mouse cursor as shown in FIG. 12 and is clicked, the footprint data send-request is sent from the browser to footprint-providing device 10.

Figure 13:
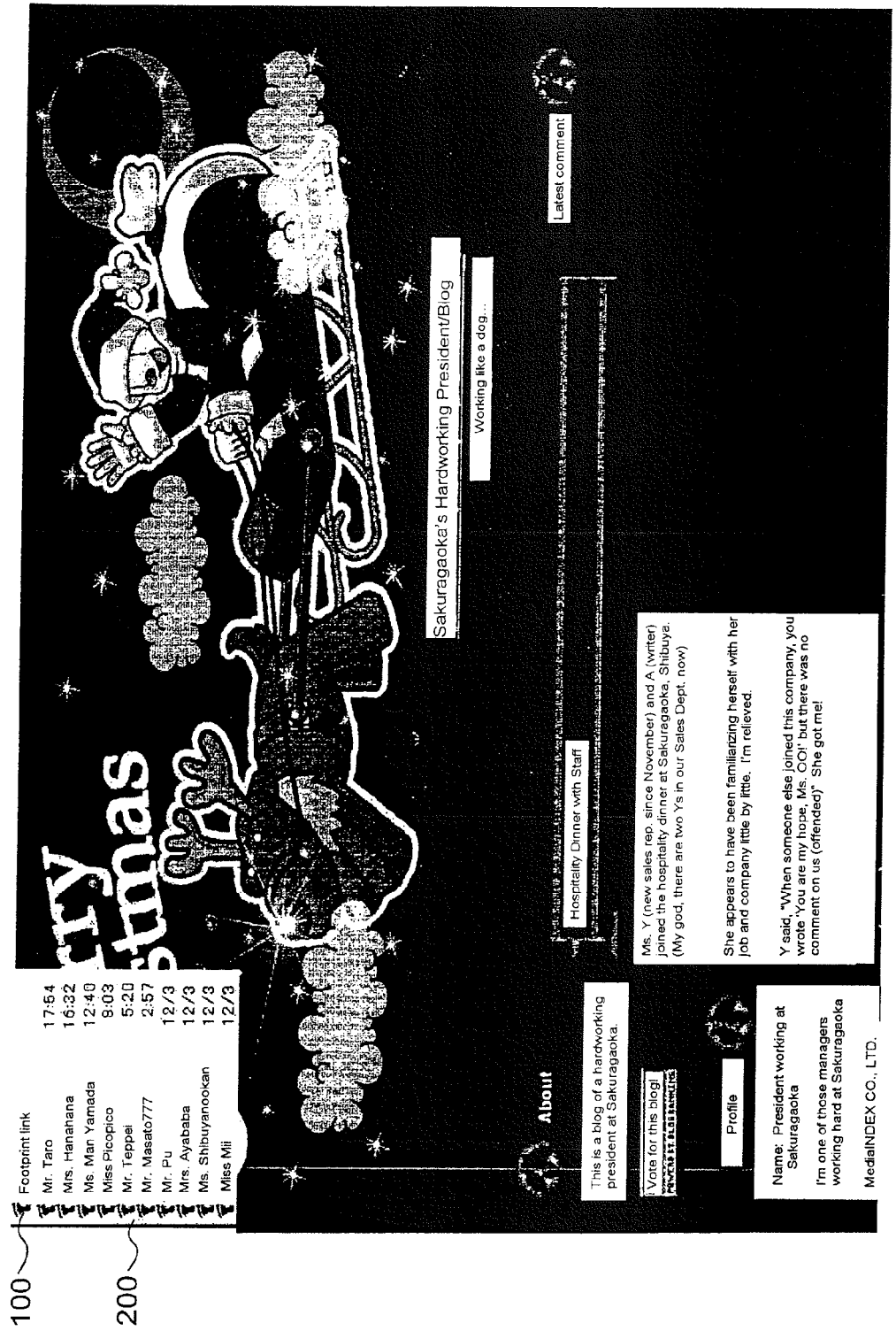
FIG. 13 is a diagram showing an example of images appearing on the screen of a client terminal.

If the browser receives the footprint data from footprint-providing device 10, the browser dynamically writes the footprint data on one part of Web page B and displays the footprint data 200 in list format under link image 100 that is on the upper left of Web page B as shown in FIG. 13.

Figure 14:
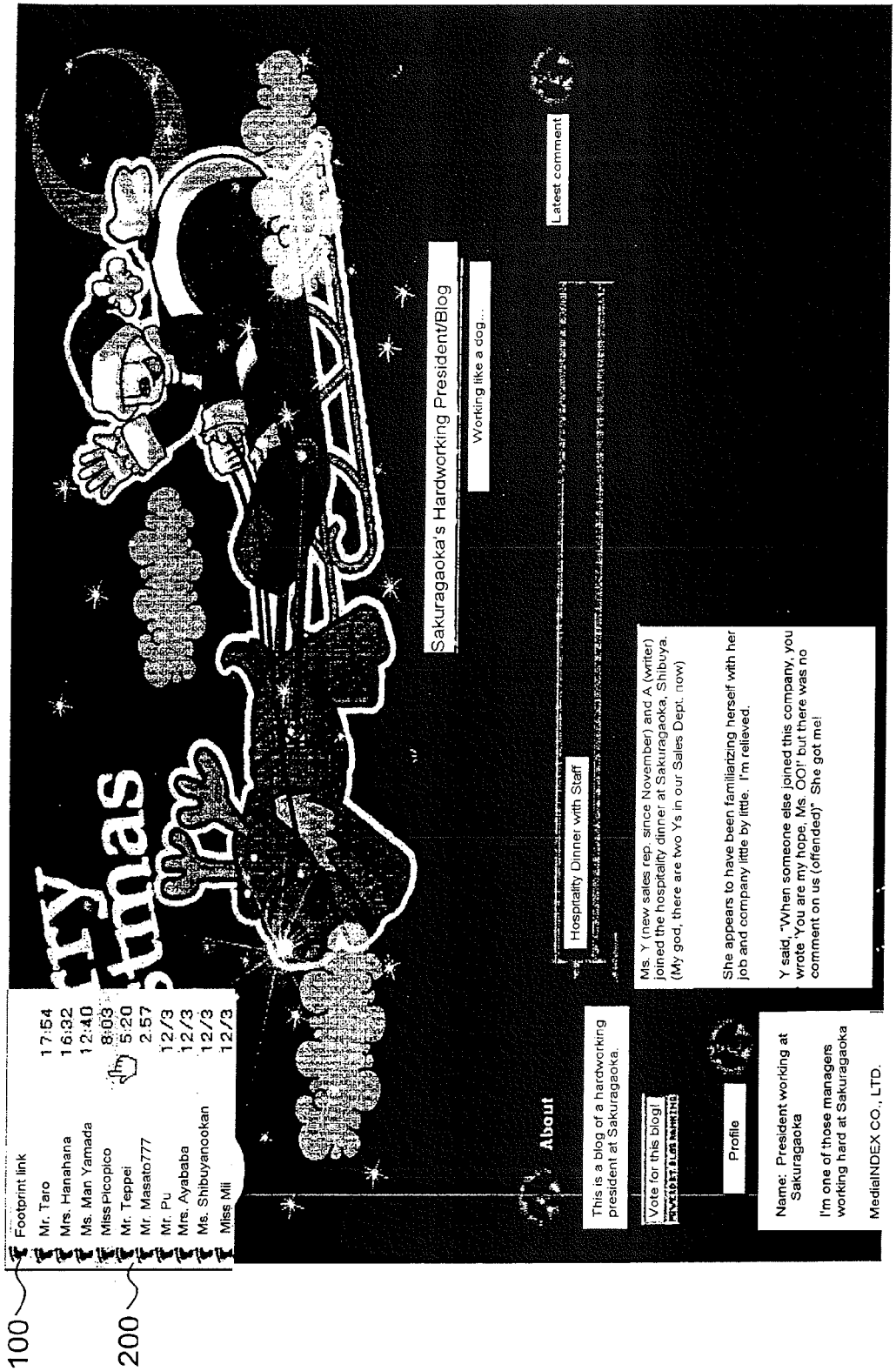
FIG. 14 is a diagram showing an example of images appearing on the screen of a client terminal.

Now, if the viewer name of footprint data 200 is pointed with a mouse cursor as shown in FIG. 14 and is clicked, the user data send-request is sent from the browser to footprint-providing device 10.

Figure 15:
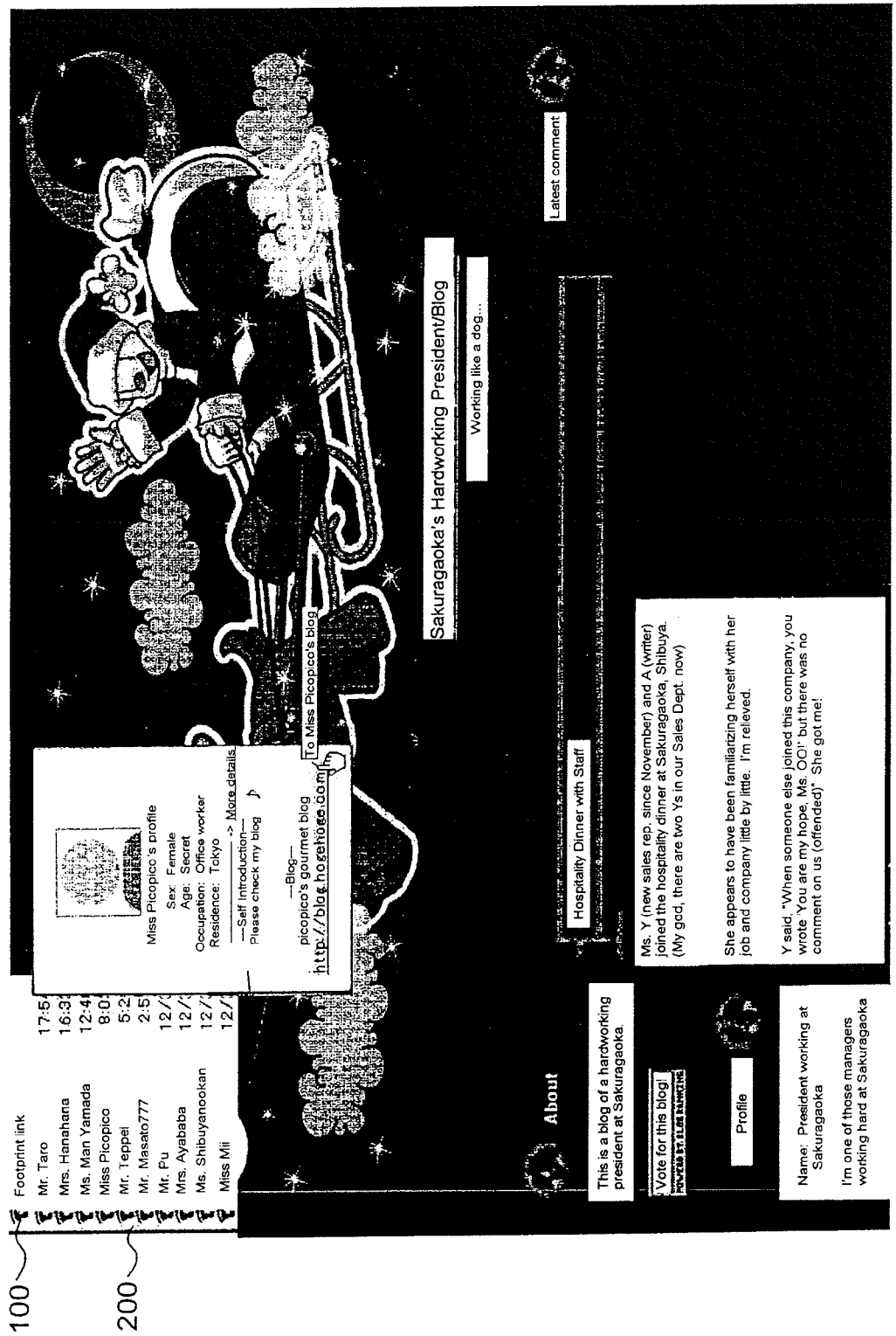
FIG. 15 is a diagram showing an example of images appearing on the screen of a client terminal.

If the browser receives the user data from footprint-providing device 10, the browser dynamically writes the user data on one part of Web page B and displays user data 300 in the area somewhat toward the center from the upper left of Web page B as shown in FIG. 15.

As described above, footprint-providing device 10 of an embodiment of the present invention sends the footprint data, which can be written on one part of this Web Page, to the browser that received a Web page from a Web server. Therefore, if footprint-providing device 10 of an embodiment of the present invention is connected to a network, it is enabled to write footprint data by browsers on one part of Web pages received from Web servers, and browsers of client terminals can display footprints even on Web pages provided by Web servers that comprise no means of putting on footprints. Hence, footprint-providing device 10 of an embodiment of the present invention can put footprints on Web pages provided by various Web servers.

Additionally, in the present mode and embodiment, the footprint client program makes the browser, for example, send the data to footprint-providing device 10 or receive the data from footprint-providing device 10. However, this sending is done "asynchronously with a view-request for a Web page", and thus it does not make the browser perform a view-request for Web page at all. In this way, the footprint client program is enabled to display footprints and user data on Web pages without making the browser cause screen transitions and wait for responses of view-requests for a Web page (enabling the browser performs other processes during the moment from a view-request to a response).

The mode and embodiment of the present invention was described above. However, these descriptions represent one example of the present invention. Thus, the present invention is not limited to these descriptions.

What is claimed is:

1. A footprint-providing device connected via a network to client terminals that view Web pages with a browser, comprising:

footprint data storing means for storing footprint data of Web pages;

footprint client program send-request receiving means for receiving a footprint client program send-request from said browser;

footprint client program generating means for generating a footprint client program that runs on said browser, if said footprint client program send-request receiving means receives said footprint client program send-request;

footprint client program sending means for sending to said browser a footprint client program that is generated by said footprint client program generating means;

footprint data update-request receiving means for receiving a footprint data update-request, which specifies a Web page identifier that identifies a Web page being viewed by said browser and a footprint identifier that identifies a viewer, from said browser that said footprint client program runs on;

footprint data updating means for specifying said Web page identifier and said footprint identifier from said received footprint data update-request, and for updating footprint data stored in said footprint data storing means using said specified Web page identifier and said specified footprint identifier, if said footprint data update-request receiving means receives said footprint data update-request;

footprint data send-request receiving means for receiving a footprint send-request, which specifies a Web page identifier that identifies a Web page being viewed by said browser, from said browser that said footprint client program runs on;

footprint data sending means for specifying said Web page identifier from said received footprint data send-request, and for retrieving footprint data of a Web page being viewed by said browser that said footprint client program runs on out of footprint data stored in said footprint data storing means using said specified Web page identifier as a key, and for sending said retrieved footprint data to said browser that said footprint client program runs on, if said footprint data send-request receiving means receives said footprint data send-request;

wherein said footprint client program generating means generates a footprint client program that is executable to perform a method comprising:

a detecting step of making said browser detect said footprint identifier in data said browser holds;

a footprint data update-request sending step of making said browser send said footprint data update-request to said footprint data update-request receiving means asynchronously with a view-request for a Web page if said footprint identifier is detected;

a footprint send-request sending step of making said browser send said footprint data send-request to said footprint data send-request receiving means asynchronously with a view-request for a Web page if a footprint data send-request event occurs;

a footprint data receiving step of making said browser receive said footprint data from said footprint data sending means asynchronously with a view-request for a Web page; and a writing step of making said browser write said received footprint data on one part of a Web page being viewed by said browser, wherein the footprint-providing device does not always send only footprint data, which indicates client terminals currently connected to a footprint-providing device.

2. A footprint-providing system comprising:

client terminals that view Web pages with a browser; and a footprint-providing device that is connected via a network to said client terminals, wherein the footprint-providing device comprising:

footprint data storing means for storing footprint data of Web pages:

footprint client program send-request receiving means for receiving a footprint client program send-request from said browser;

footprint client program generating means for generating a footprint client program that runs on said browser, if said footprint client program send-request receiving means receives said footprint client program send-request;

footprint client program sending means for sending to said browser a footprint client program that is generated by said footprint client program generating means;

footprint data update-request receiving means for receiving a footprint data update-request, which specifies a Web page identifier that identifies a Web page being viewed by said browser and a footprint identifier that identifies a viewer, from said browser that said footprint client program runs on;

footprint data updating means for specifying said Web page identifier and said footprint identifier from said received footprint data update-request, and for updating footprint data stored in said footprint data storing means using said specified Web page identifier and said specified footprint identifier, if said footprint data update-request receiving means receives said footprint data update-request;

footprint data send-request receiving means for receiving a footprint send-request, which specifies a Web page identifier that identifies a Web page being viewed by said browser, from said browser that said footprint client program runs on;

footprint data sending means for specifying said Web page identifier from said received footprint data send-request, and for retrieving footprint data of a Web page being viewed by said browser that said footprint client program runs on out of footprint data stored in said footprint data storing means using said specified Web page identifier as a key, and for sending said retrieved footprint data to said browser that said footprint client program runs on, if said footprint data send-request receiving means receives said footprint data send-request;

wherein said footprint client program generating means generates a footprint client program that is executable to perform a method comprising:

a detecting step of making said browser detect said footprint identifier in data said browser holds;

a footprint data update-request sending step of making said browser send said footprint data update-request to said footprint data update-request receiving means asynchronously with a view-request for a Web page if said footprint identifier is detected;

a footprint send-request sending step of making said browser send said footprint data send-request to said footprint data send-request receiving means asynchronously with a view-request for a Web page if a footprint data send-request event occurs;

a footprint data receiving step of making said browser receive said footprint data from said footprint data sending means asynchronously with a view-request for a Web page; and a writing step of making said browser write said received footprint data on one part of a Web page being viewed by said browser, wherein the footprint-providing device does not always send only footprint data, which indicates client terminals currently connected to a footprint-providing device.

* * * * *

UNITED STATES PATENT AND TRADEMARK OFFICE
CERTIFICATE OF CORRECTION

| | | |
|---|---|---|
| PATENT NO. | : 7,822,854 B2 | Page 1 of 1 |
| APPLICATION NO. | : 12/492776 | |
| DATED | : October 26, 2010 | |
| INVENTOR(S) | : Nobuyuki Kano | |

It is certified that error appears in the above-identified patent and that said Letters Patent is hereby corrected as shown below:

Title Page, insert (63) Related Application Data --This application is a continuation of International Application 2007/001374 filed on December 10, 2007--.

Signed and Sealed this
Nineteenth Day of April, 2011

David J. Kappos
*Director of the United States Patent and Trademark Office*